United States Patent
Hellgren

(10) Patent No.: US 12,496,926 B2
(45) Date of Patent: Dec. 16, 2025

(54) METHOD FOR CONTROLLING CHARGING OF ELECTRICALLY DRIVEN VEHICLES, A COMPUTER PROGRAM, A COMPUTER READABLE MEDIUM, A CONTROL UNIT AND A BATTERY CHARGING SYSTEM

(71) Applicant: Volvo Truck Corporation, Gothenburg (SE)

(72) Inventor: Jonas Hellgren, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 729 days.

(21) Appl. No.: 17/612,854

(22) PCT Filed: May 20, 2019

(86) PCT No.: PCT/EP2019/062987
§ 371 (c)(1),
(2) Date: Nov. 19, 2021

(87) PCT Pub. No.: WO2020/233787
PCT Pub. Date: Nov. 26, 2020

(65) Prior Publication Data
US 2022/0219562 A1 Jul. 14, 2022

(51) Int. Cl.
*B60L 53/62* (2019.01)
*B60L 53/66* (2019.01)
(Continued)

(52) U.S. Cl.
CPC .............. *B60L 53/62* (2019.02); *B60L 53/66* (2019.02); *B60L 58/12* (2019.02); *H02J 7/0047* (2013.01);
(Continued)

(58) Field of Classification Search
CPC ...................................................... B60L 53/62
(Continued)

(56) References Cited

U.S. PATENT DOCUMENTS

2005/0077877 A1 4/2005 Cawthorne
2014/0028254 A1 1/2014 Shane et al.
(Continued)

FOREIGN PATENT DOCUMENTS

CN 102574476 A 7/2012
CN 103875148 A 6/2014
(Continued)

OTHER PUBLICATIONS

Japanese Office Action for Japanese Patent No. 2021-564097, mailed Dec. 2, 2022, 4 pages.
(Continued)

*Primary Examiner* — Eric D Lee
(74) *Attorney, Agent, or Firm* — Sage Patent Group

(57) ABSTRACT

The invention relates to a method for controlling charging of at least one electrically driven vehicle of a vehicle fleet including a plurality of vehicles at a charging area, the method includes the step of defining a reference minimum charging energy level for a battery of the vehicle. Further the method includes the step of determining a charging energy level of the battery of the vehicle and comparing the charging energy level with the reference minimum charging energy level. Lastly the method includes assigning a charging command to the vehicle to charge the vehicle if the determined charging energy level of the battery is below said reference minimum charging energy level, and wherein the charging command depends from a charging parameter or a combination of multiple charging parameters if the determined charging energy level of the battery of the vehicle is above said reference minimum charging energy level.

13 Claims, 2 Drawing Sheets

(51) Int. Cl.
    *B60L 58/12* (2019.01)
    *H02J 7/00* (2006.01)
(52) U.S. Cl.
    CPC .......... *H02J 7/007* (2013.01); *H02J 7/00712* (2020.01); *H02J 7/007182* (2020.01); *B60L 2250/14* (2013.01)
(58) Field of Classification Search
    USPC ........................................................ 320/109
    See application file for complete search history.

(56) References Cited

U.S. PATENT DOCUMENTS

| | | | |
|---|---|---|---|
| 2016/0352113 A1* | 12/2016 | Zhao | B60L 53/14 |
| 2017/0315557 A1 | 11/2017 | Vogt et al. | |
| 2018/0086223 A1 | 3/2018 | Lindemann et al. | |
| 2018/0290546 A1 | 10/2018 | McGrath et al. | |
| 2019/0039467 A1* | 2/2019 | Hortop | H02J 7/0071 |

FOREIGN PATENT DOCUMENTS

| | | |
|---|---|---|
| CN | 106183843 A | 12/2016 |
| EP | 2657062 A1 | 10/2013 |
| JP | 2006054958 A | 2/2006 |
| JP | 2011188657 A | 7/2014 |
| JP | 2015230817 A | 12/2015 |
| WO | 2013051151 A1 | 4/2013 |

OTHER PUBLICATIONS

International Search Report and Written Opinion of the International Searching Authority, PCT/EP2019/062987, mailed Feb. 17, 2020, 18 pages.

International Preliminary Report on Patentability of the International Preliminary Examining Authority, PCT/EP2019/062987, mailed Aug. 25, 2021, 11 pages.

* cited by examiner

METHOD FOR CONTROLLING CHARGING OF ELECTRICALLY DRIVEN VEHICLES, A COMPUTER PROGRAM, A COMPUTER READABLE MEDIUM, A CONTROL UNIT AND A BATTERY CHARGING SYSTEM

CROSS REFERENCE TO RELATED APPLICATIONS

This application is a 35 U.S.C. § 371 national stage application of PCT International Application No. PCT/EP2019/062987 filed on May 20, 2019, the disclosure and content of which is incorporated by reference herein in its entirety.

TECHNICAL FIELD

The invention relates to a method for controlling charging of electrically driven vehicles of a vehicle fleet comprising a plurality of vehicles, a computer program, a computer readable medium, a control unit and a battery charging system.

The invention can be applied in heavy-duty vehicles, such as trucks, buses and construction equipment. Although the invention will be described with respect to a heavy-duty vehicle, the invention is not restricted to this particular vehicle, but may also be used in other vehicles such as a car.

BACKGROUND

For electrically driven vehicles for example after a mission, it has to be decided whether or not they are charged, if they approach a charging area. For example, in US2017315557 A1 a method for automatically charging an autonomous vehicle is described, according to which the vehicle is charged, when a state of charge of a battery of the autonomous vehicle is low. The decision depends on information on vehicle location, current state of charge of vehicle battery, type of battery etc. However further improvements are needed. In particular fleet operating costs have to be lowered taking into account negative impacts of charging like power losses and rapid degradation of the battery.

SUMMARY

An object of the invention is to improve charging of electric vehicles by avoiding or minimizing power losses and rapid degradation of the battery of the electric vehicle, in particular for vehicles of a fleet.

According to a first aspect of the invention, the object is achieved by a method according to claim 1. In particular, a method for controlling charging of at least one electrically driven vehicle of a vehicle fleet comprising a plurality of vehicles at a charging area, the method is characterized by the steps of:
  defining a reference minimum charging energy level for a battery of the vehicle;
  determining a charging energy level of the battery of the vehicle;
  comparing the charging energy level with the reference minimum charging energy level and
  assigning a charging command to the vehicle
    to charge the vehicle if the determined charging energy level of the battery is below said reference minimum charging energy level, and
  wherein the charging command depends from a charging parameter or a combination of multiple charging parameters if the determined charging energy level of the battery of the vehicle is above said reference minimum charging energy level.

The invention is based on the recognition that power losses and rapid degradation of a battery are mainly caused by charging with high charging power and that the charging power can be implicitly controlled via the charging energy level of the battery. A battery resembles a balloon, when it is full it is hard to charge it anymore. This means for high charging energy levels the possible charging power is low (in absolute terms).

By letting the charge or not decision depend on the battery charging energy level of the requesting vehicle the charging power level can be implicitly controlled. If, for example, the tendency is to more frequently block requests where the charge level is low and more frequently accept requests where it is high, the consequence will be an in average relatively low charge power level. This phenomenon is used to tackle the problem with high power losses and rapid degradation at high power levels in the scope of the invention. The invention includes the recognition that it is much desired to charge with a moderate charging power level. Energy losses and battery degradation thus can be minimized by letting the reference minimum charging energy level be relatively high.

Thus the invention allows to implicitly control the charging power level of the battery via the charging energy level, even without adding the complexity of another charging command beside the binary charge or not. Nevertheless, beside the binary charge command also a continuous or discrete reference battery power level can be taken into account within the scope of the invention.

In the following further embodiments of the method are described, which can be combined if not described as alternatives.

According to one embodiment of the method, the reference minimum charging energy level is defined depending from a minimum charging energy level parameter or a combination of multiple minimum charging energy level parameters selected from the following:
  a user input defining an absolute minimum charging energy level which is not to be undercut by said minimum charging energy level; and/or
  an expected required charging energy level calculated from an expected energy consumption of the vehicle until the vehicle reaches the charging area; and/or
  an expected distance of a mission of the vehicle until it reaches the charging area; and/or
  an expected charging time interval available for the vehicle until a further vehicle approaches the charging area; and/or
  an average energy consumption of the vehicle during its last mission or a plurality of its last missions; and/or
  a desired average charging energy level of the vehicles of the vehicle fleet, wherein said desired average charging energy level is entered via a user interface or calculated; and/or
  an average energy consumption of all vehicles of the vehicle fleet during the last mission or a plurality of last missions; and/or
  a defined maximum charging power level of the battery of at least said vehicle of said vehicle fleet, preferably of each vehicle of said vehicle fleet, wherein said maximum charging power level is entered via a user interface or calculated.

The reference minimum charging energy level is a first criteria for the charge or not charge decision. In order to determine the reference minimum charging energy level, the above listed multiple minimum charging energy level parameters can be considered to optimize the charging behavior of the vehicle in view of mission, state of charge and further parameters. In particular, a user input for an absolute minimum charging energy level or desired average charging energy level of the vehicles of the vehicle fleet can be considered. Furthermore, information on the planned mission of the vehicle can be taken into account, like an expected energy consumption, an expected distance of the mission or known data on prior missions. Furthermore, a maximum charging power level can be taken into account to restrict charging with too high charging power in order to improve battery life. Also average data on all vehicles of the fleet like average energy consumption of all vehicles of the vehicle fleet during the last mission or a plurality of last missions can be used. This is in particular relevant for vehicle fleets with circulating and repetitive missions. Furthermore, an available charging time interval until the next vehicle arrives can be taken into account when determining the reference minimum charging energy level.

According to a further embodiment, the charging parameter or the combination of multiple charging parameters is selected from the following:
  the expected distance of the mission of the vehicle until it reaches the charging area; and/or
  the expected charging time interval available for said vehicle until a further vehicle approaches the charging area; and/or
  the average energy consumption of the vehicle during the last mission or a plurality of last missions; and/or
  the desired average charging energy level of the vehicles of the fleet, wherein said desired average charging energy level is entered via the user interface or calculated; and/or
  the average energy consumption of all vehicles of the vehicle fleet during their last mission or their plurality of last missions and/or
  the defined maximum charging power of the battery of at least said vehicle of said vehicle fleet, preferably of each vehicle of said vehicle fleet.

If the charging energy level is above the reference minimum charging energy level the charging decision further depends on the charging parameter or multiple charging parameters. By taking into account the parameters listed above the charging decision can be further improved taking into account the mission of the vehicle like the distance or prior energy consumption and charging properties of the vehicle or the vehicle fleet, like the average energy consumption or maximum charging power of the battery.

Preferably, determining the charging energy level of the battery of the vehicle comprises:
  determining a current battery charging energy level of the vehicle at the charging area; and/or
  determining an expected battery charging energy level of the vehicle approaching the charging area.

Thus actual charging level and/or expectations on the battery charging energy level can be taken into account by determining the charging command.

Preferably, said maximum charging power level and/or said desired average charging energy level is calculated taking into account energy losses and battery degradation. With this embodiment energy losses and battery degradation can be further decreased by determining the maximum charging power level and/or the desired average charging energy level based on these criteria.

In an embodiment of the method the charging command is assigned to the charging area, if the charging command is to charge the vehicle. Thus the charging area is informed of the need of charge of the vehicle.

In a further embodiment the following step is included:
  assigning a stopping command to a vehicle being charged at the charging area to stop the charging of the battery of the vehicle if a further charging command was assigned to a further vehicle at said charging area, wherein said further charging command is assigned based on one or multiple of the minimum charging energy level parameters and/or charging parameters related to said further vehicle and further based on a comparison of this one or multiple of the minimum charging energy level parameters and/or charging parameters related to said further vehicle to the one or multiple of the minimum charging energy level parameters and/or charging parameters applied when assigning the charging command to the vehicle being charged or with a current one or current multiple of the minimum charging energy level parameters and/or charging parameters related to the vehicle being charged.

With this step not only the charging state and/or mission of the vehicle are taken into account for the charging decision but also a following vehicle and its charging state and/or mission. Thus it can be avoided that a charging point or charging node in the charging area is blocked by a vehicle, which also could be charged in a later stage, while a vehicle, which has to be charged immediately can't reach the charging point or charging node. Thus with this step the charging of the fleet as a whole is further improved.

According to a second aspect of the invention, the object is achieved by a computer program according to claim 8. The computer program comprises program code means for performing the steps of any of any of the embodiments of the method according to the first aspect of the invention when said program is run on a computer. Furthermore, the object is achieved by the provision of a computer readable medium carrying a computer program comprising program code means for performing the steps of any of the embodiments of the method according to the first aspect when said program product is run on a computer.

According to a third aspect of the invention, the object of the invention is achieved by a charging control unit according to claim 10. The charging control unit for controlling the charging of at least one electrically driven vehicle of a vehicle fleet comprising a plurality of vehicles is configured to perform the steps of the method according to the first aspect of the invention.

In an embodiment the charging control unit according to the third aspect of the invention is characterized in that the charging control unit comprises a user interface to manually enter data or is connected for communication with said user interface. Thus a user can interact with the charging control unit to provide further data or further focus for the charging decision.

In a further embodiment the charging control unit is a centralized control unit for all vehicles of the vehicle fleet. Thus only one charging control unit for the fleet is necessary.

According to a fourth aspect the invention relates to battery charging system according to claim 13, which comprises:
  a charging control unit according to the second aspect of the invention, and
  a vehicle control unit for at least one electrically driven vehicle of a vehicle fleet comprising a plurality of vehicles and/or a charging area control unit for at least one charging area to charge the at least one electrically driven vehicle of the vehicle fleet.

Preferably the charging control unit and/or the charging area control unit and/or the vehicle control unit are connected with one another for communication.

In an embodiment of the battery charging system the charging control unit is integrated in the charging area control unit or in the vehicle control unit.

In a further embodiment the battery charging system comprises a user interface to manually enter data. Thus a user can interact with the battery charging system to provide further data or further focus for the charging decision.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
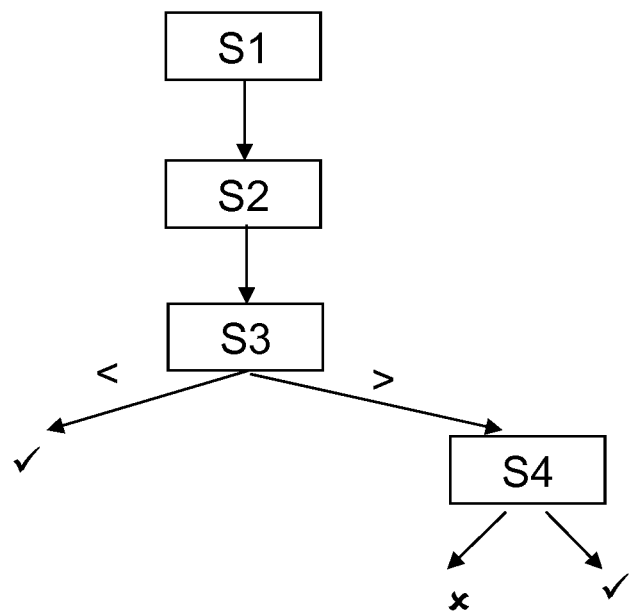
FIG. 1 is a schematic block diagram depicting steps in an example embodiment of a method for controlling charging of at least one electrically driven vehicle of a vehicle fleet and FIG. 2 is a schematic drawing of an example embodiment of a battery charging system according to the fourth aspect of the invention

FIG. 1 is a schematic block diagram depicting steps in a preferred example embodiment of a method for controlling charging of at least one electrically driven vehicle of a vehicle fleet. Particularly, this preferred embodiment of the method comprises four steps: defining a reference minimum charging energy level for a battery of the vehicle in step S1; determining a charging energy level of the battery of the vehicle in step S2; comparing the charging energy level with the reference minimum charging energy level in S3 and assigning a charging command to the vehicle to charge the vehicle if the determined charging energy level of the battery is below said reference minimum charging energy level, and in step S4 determining the charging command depending from a charging parameter or a combination of multiple charging parameters if the determined charging energy level of the battery of the vehicle is above said reference minimum charging energy level.

The reference minimum charging energy level is in the preferred example determined in step S1 depending from a minimum charging energy level parameter or a combination of multiple minimum charging energy level parameters. In particular this minimum charging energy level parameter or these minimum charging energy level parameters can be selected from parameters characterizing the planned or prior mission of the vehicle, like an expected required charging energy level calculated from an expected energy consumption of the vehicle until the vehicle reaches the charging area; and/or an expected distance of a mission of the vehicle until it reaches the charging area; and/or an average energy consumption of the vehicle during its last mission or a plurality of its last missions. Additionally or alternative parameters representing user input or calculations can be used as minimum charging energy level parameters, like user input defining an absolute minimum charging energy level which is not to be undercut by said minimum charging energy level; and/or a desired average charging energy level of the vehicles of the vehicle fleet, wherein said desired average charging energy level is entered via a user interface or calculated; and/or a maximum charging power level, wherein said maximum charging power level is entered via a user interface or calculated. Furthermore, parameters derived from the vehicle fleet or single vehicles of the fleet can be used as minimum charging energy level parameters, like an expected charging time interval available for the vehicle until a further vehicle approaches the charging area; and/or an average energy consumption of all vehicles of the vehicle fleet during the last mission or a plurality of last missions; and/or In step S4 the charging parameter or charging parameters for determining the charging command in the preferred embodiment also take into account the mission and state of charge of the vehicle as well as user input and information derived from the fleet as a whole or from single vehicles of the fleet like the following vehicle in a row. In particular, the following parameters can be used as charging parameter alone or in combination with others: the expected distance of the mission of the vehicle until it reaches the charging area, the expected charging time interval available for said vehicle until a further vehicle approaches the charging area; the average energy consumption of the vehicle during the last mission or a plurality of last missions; the desired average charging energy level of the vehicles of the fleet, wherein said desired average charging energy level is entered via the user interface or calculated; the average energy consumption of all vehicles of the vehicle fleet during their last mission or their plurality of last missions and the defined maximum charging power level of the battery of at least said vehicle of said vehicle fleet, preferably of each vehicle of said vehicle fleet.

Figure 2:
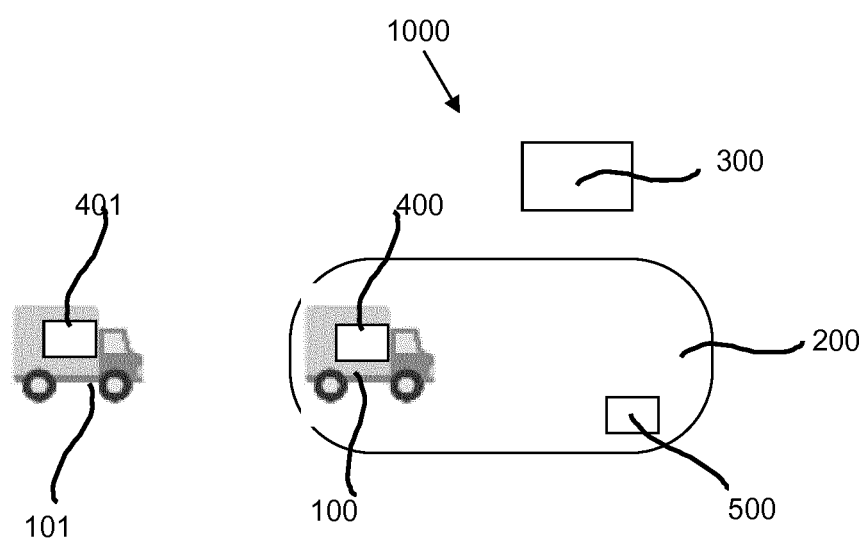

FIG. 2 is a schematic drawing of an example embodiment of a battery charging system 1000, which comprises in the shown embodiment a charging control unit 300, two vehicle control units 400, 401 for each of shown the electrically driven vehicles 100, 101 of a vehicle fleet comprising a plurality of vehicles and a charging area control unit 500 for the charging area 200 to charge the at least one electrically driven vehicle of the vehicle fleet. In the shown embodiment the charging control unit 300 is configured to perform the steps of the method according to the first aspect of the invention, in particular defining a reference minimum charging energy level for a battery of a vehicle; determining a charging energy level of the battery of the vehicle; comparing the charging energy level with the reference minimum charging energy level and assigning a charging command to the vehicle to charge the vehicle if the determined charging energy level of the battery is below said reference minimum charging energy level, and determining the charging command depending from a charging parameter or a combination of multiple charging parameters if the determined charging energy level of the battery of the vehicle is above said reference minimum charging energy level.

The charging control unit 300 in this example is a centralized charging control unit, which controls all the vehicles of the fleet, in particular both shown vehicles 100 and 101. The charging control unit 300 communicates with the vehicle control units 400, 401 and the charging area control unit. If the command for the respective vehicle is to charge the charging command is send to the respective vehicle control unit and the charging area control unit, in order to command the vehicle to a charging point or charging node at the charging area.

The charging control unit 300 in the shown embodiment is also able to assign a stopping command to for example vehicle 100 being charged at the charging area to stop the charging of the battery of the vehicle 100 if a further charging command was assigned to the further vehicle 101 at said charging area. Said further charging command is assigned based on one or multiple of the minimum charging energy level parameters and/or charging parameters related to said further vehicle 101 and further based on a comparison of this one or multiple of the minimum charging energy level parameters and/or charging parameters related to said further vehicle 101 to the one or multiple of the minimum charging energy level parameters and/or charging parameters applied when assigning the charging command to the vehicle 100 being charged or with a current one or current multiple of the minimum charging energy level parameters and/or charging parameters related to the vehicle being charged. Thus the charging control unit is able to prioritize the vehicles of the fleet based on the minimum charging energy level parameters and/or the charging parameters.

It is to be understood that the present invention is not limited to the embodiments described above and illustrated in the drawings; rather, the skilled person will recognize that many changes and modifications may be made within the scope of the appended claims.

The invention claimed is:

1. A method for controlling charging of at least one electrically driven vehicle of a vehicle fleet comprising a plurality of vehicles at a charging area, the method comprising:
   defining a reference minimum charging energy level for a battery of the vehicle;
   determining a charging energy level of the battery of the vehicle;
   comparing the charging energy level with the reference minimum charging energy level; and
   assigning a charging command to the vehicle
      to charge the vehicle if the determined charging energy level of the battery is below said reference minimum charging energy level, and
      wherein the charging command depends from a charging parameter or a combination of multiple charging parameters if the determined charging energy level of the battery of the vehicle is above said reference minimum charging energy level,
   wherein the reference minimum charging energy level is defined depending from a combination of multiple minimum charging energy level parameters selected from the following:
      a user input defining an absolute minimum charging energy level which is not to be undercut by said minimum charging energy level; and/or
      an expected required charging energy level calculated from an expected energy consumption of the vehicle until the vehicle reaches the charging area; and/or
      an expected distance of a mission of the vehicle until it reaches the charging area; and/or
      an expected charging time interval available for the vehicle until a further vehicle approaches the charging area; and/or
      an average energy consumption of the vehicle during its last mission or a plurality of its last missions; and/or
      a desired average charging energy level of the vehicles of the vehicle fleet, wherein said desired average charging energy level is entered via a user interface or calculated; and/or
      an average energy consumption of all vehicles of the vehicle fleet during the last mission or a plurality of last missions;
   assigning a stopping command to a vehicle being charged at the charging area to stop the charging of the battery of the vehicle if a further charging command was assigned to a further vehicle at said charging area, wherein said further charging command is assigned based on one or multiple of the minimum charging energy level parameters and/or charging parameters related to said further vehicle and further based on a comparison of this one or multiple of the minimum charging energy level parameters and/or charging parameters related to said further vehicle to the one or multiple of the minimum charging energy level parameters and/or charging parameters applied when assigning the charging command to the vehicle being charged or with a current one or current multiple of the minimum charging energy level parameters and/or charging parameters related to the vehicle being charged, wherein the charging parameter or the combination of multiple charging parameters is selected from the following:
      the expected charging time interval available for said vehicle until a further vehicle approaches the charging area; and/or
      the desired average charging energy level of the vehicles of the fleet, wherein said desired average charging energy level is entered via the user interface or calculated; and/or
      the average energy consumption of all vehicles of the vehicle fleet during their last mission or their plurality of last missions.

2. A method according to claim 1, wherein determining the charging energy level of the battery of the vehicle comprises:
   determining a current battery charging energy level of the vehicle at the charging area; and/or
   determining an expected battery charging energy level of the vehicle approaching the charging area.

3. A method according to claim 1, wherein said desired average charging energy level is calculated taking into account energy losses and battery degradation.

4. A method according to claim 1, wherein the charging command is assigned to the charging area if the charging command is to charge the vehicle.

5. A computer program product comprising a non-transitory computer readable storage medium including program code therein which, when run on a computer, causes the computer to carry out the steps of claim 1.

6. A non-transitory computer readable medium comprising a computer program including program code therein, for performing the steps of claim 1 when said computer program is run on a computer.

7. A charging control unit for controlling the charging of at least one electrically driven vehicle of a vehicle fleet comprising a plurality of vehicles, wherein the control unit is configured to perform the steps of the method according to claim 1.

8. A charging control unit according to claim 7, wherein the charging control unit comprises a user interface to manually enter data or is connected for communication with said user interface.

9. A charging control unit according to claim 7, wherein the charging control unit is a centralized control unit for all vehicles of the vehicle fleet.

10. A battery charging system comprising:
a charging control unit according to claim 7, and
a vehicle control unit for at least one electrically driven vehicle of a vehicle fleet comprising a plurality of vehicles; and/or
a charging area control unit for at least one charging area to charge the at least one electrically driven vehicle of the vehicle fleet.

11. A battery charging system according to claim 10, wherein the charging control unit and/or the charging area control unit and/or the vehicle control unit are connected with one another for communication.

12. A battery charging system according to claim 10, wherein the charging control unit is integrated in the charging area control unit or in the vehicle control unit.

13. A battery charging system according to claim 12, comprising a user interface to manually enter data.

* * * * *